United States Patent [19]

Kimura et al.

[11] Patent Number: 5,229,587
[45] Date of Patent: Jul. 20, 1993

[54] BAR CODE LABEL PRINTER AND BAR CODE LABEL ISSUING METHOD

[75] Inventors: Kenichi Kimura; Mitsuyoshi Satoh; Hideaki Matsuda, all of Miyagi, Japan

[73] Assignee: Tohoku Ricoh Co., Ltd., Shibata, Japan

[21] Appl. No.: 797,016

[22] Filed: Nov. 25, 1991

[30] Foreign Application Priority Data

Nov. 28, 1990 [JP] Japan .................. 2-327767

[51] Int. Cl.5 .......................... G01D 15/10
[52] U.S. Cl. .................. 235/432; 235/487; 156/DIG. 48
[58] Field of Search .............. 235/385, 432, 487, 488; 400/103, 120; 156/384, DIG. 48

[56] References Cited

U.S. PATENT DOCUMENTS

| | | | |
|---|---|---|---|
| 4,641,347 | 2/1987 | Clark et al. | 235/432 |
| 4,673,803 | 6/1987 | Zerle et al. | 235/474 |
| 4,706,096 | 11/1987 | Sato | 400/103 |
| 4,757,329 | 7/1988 | Sato et al. | 400/103 |

Primary Examiner—Edward P. Westin
Assistant Examiner—Stephone Allen
Attorney, Agent, or Firm—Armstrong, Westerman, Hattori, McLeland & Naughton

[57] ABSTRACT

The invention relates to a bar code label printer including a label sheet feeding unit for feeding a label sheet on which plural labels are adhered to at regular intervals, a printing unit for printing a bar code on the respective labels, a label peeling unit for peeling the printed labels from the label sheet, a sheet drawing unit for drawing the label sheet after the peeling unit, a bar code verifying unit for verifying the bar code printed on the label to detect an ineffective bar code, a re-printing unit for re-printing the same bar code as the ineffective bar code on the next label when the bar code verifying unit detects the ineffective bar code, and an ineffective bar code label remaining unit for remaining the ineffective bar code label on the label sheet without peeling. A bar code label issuing method uses the above described bar code label printer to issue only effective bar code label in an automatically control manner.

6 Claims, 5 Drawing Sheets

BAR CODE LABEL PRINTER AND BAR CODE LABEL ISSUING METHOD

BACKGROUND OF THE INVENTION

1. Field of the Invention

The present invention relates to a bar code label printer which can print bar codes on labels adhered to a label sheet and peel off each of the printed labels from the sheet to feed out of the printer. Further, the present invention relates to a method for issuing the bar code label produced by the printer.

2. Description of the Prior Art

Commonly used bar code label printers as disclosed in the example of Japanese Patent Application Laid Open Publications No. 62-182029 and 62-216771 are generally equipped with a sheet feeding mechanism to feed a label sheet on which multiple labels are adhered at regular intervals, a printing mechanism to print a bar code on each of the labels, a label peeling mechanism to peel the printed label from the label sheet, and a drawing mechanism to draw the label sheet after peeling.

In these conventional printers, the bar code labels printed with bar codes representing specific information of commercial articles such as name, price, weight and so on are peeled from the label sheets issued, to adhere the labels on respective articles.

However, these conventional bar code printers cannot detect ineffective bar code labels such as a bar code with voids or spots, or too wide or narrow bars which causes mis-reading or disablement of reading.

Thus, such an ineffective bar code label is also peeled from the label sheet by the peeling mechanism and supplied to adhesion on the article. This may cause various problems such as mis-reading or out of reading at a cashier desk and the like.

If an operator finds an ineffective bar code label, the conventional printers must be stopped to remove the ineffective bar code label, and the removed label is deposited to re-print the new bar code on the other label after a series of printing operations. This complicated works cause the operator to feel troublesome.

SUMMARY OF THE INVENTION

It is an object of the present invention to provide an improved bar code label printer which can detect ineffective bar code labels and remove the ineffective labels from a label sheet.

Another object of the present invention is to provide a bar code label issuing method for issuing only effective bar code labels.

To accomplish the above object, a bar code label printer according to the present invention comprises a label sheet feeding means for feeding a label sheet on which plural labels are adhered at regular intervals, a printing means for printing bar code on the respective labels, a label peeling means for peeling the printed labels from the label sheet, a sheet drawing means for drawing the label sheet after the peeling means, a bar code verifying means for verifying the bar code printed on the label to detect an ineffective bar code, a re-printing means for re-printing the same bar code on the next label when an ineffective bar code label is detected by the bar code veryifying means, and an ineffective bar code label remaining means for remaining the ineffective bar code label on the label sheet without peeling.

Further, the method for issuing only effective bar code labels according to the present invention comprises a bar code veryifying step to verify the bar code printed on the label by a bar code printer to detect an ineffective bar code and output either an issuing signal to peel the bar code label and issue it when an ineffective bar code label is not detected or a re-printing step to re-print the same bar code on the next label in response to the re-printing signal from the bar code verifying step, and an ineffective bar code label remaining step to remain the ineffective bar code label on the label sheet without peeling.

Other objects of this invention will become obvious upon understanding the illustrative embodiments about to be described or will be indicated in the appended claims. Various advantages not referred to herein will occur to one skilled in the art upon employment of the invention in practice.

DETAILED DESCRIPTION OF PREFERRED EMBODIMENT

One preferred embodiment of the present invention will be described in detail with referring to the accompanying drawings.

Figure 1:
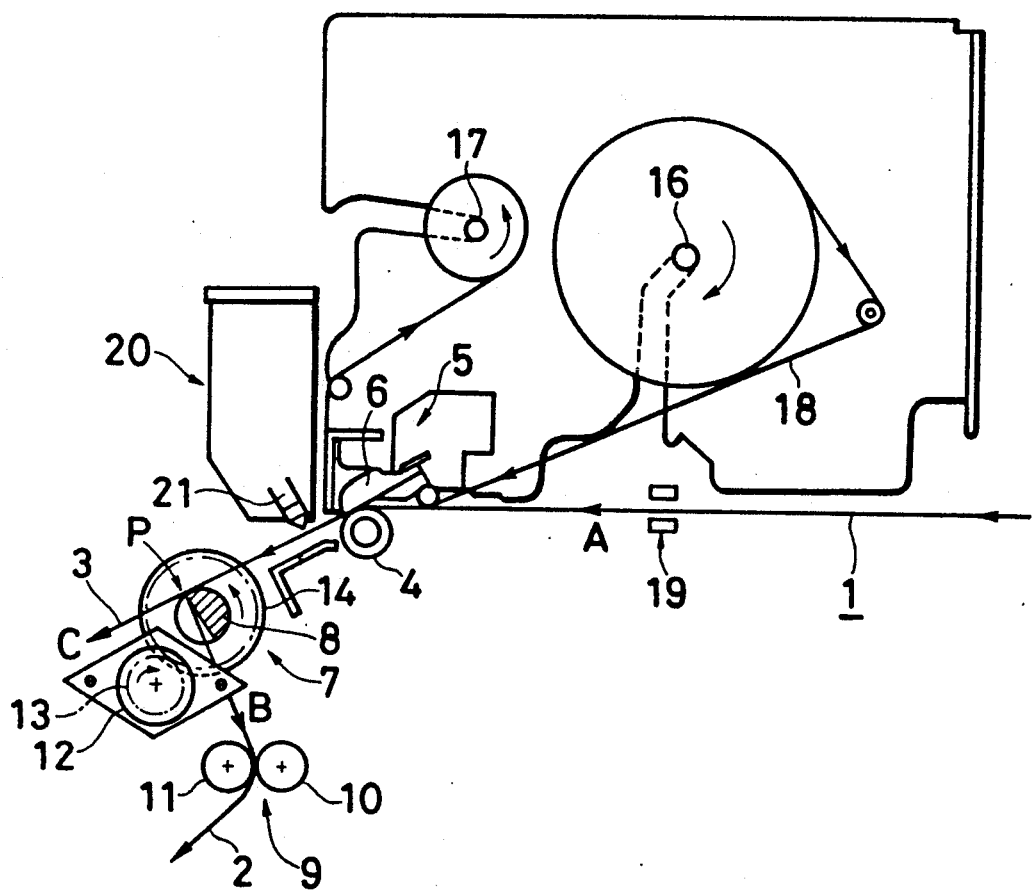
FIG. 1 is a schematic illustration showing a bar code label printer according to one embodiment of the present invention.
Figure 2:
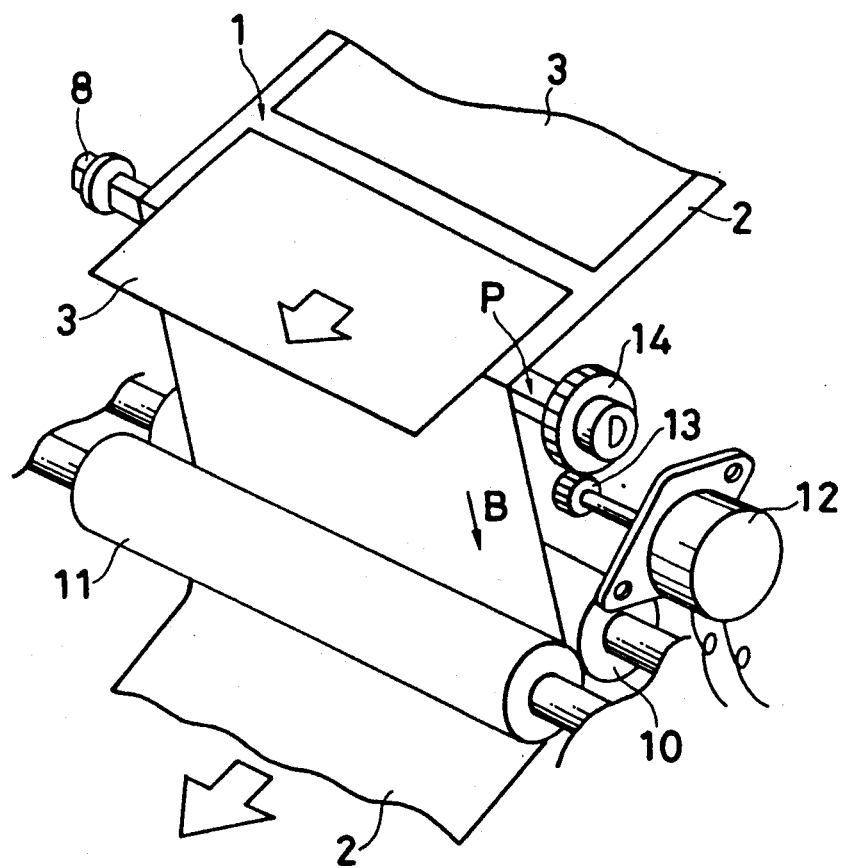
FIG. 2 is an enlarged illustration showing a bar code label peeling mechanism in a peeling operation.
Figure 3:
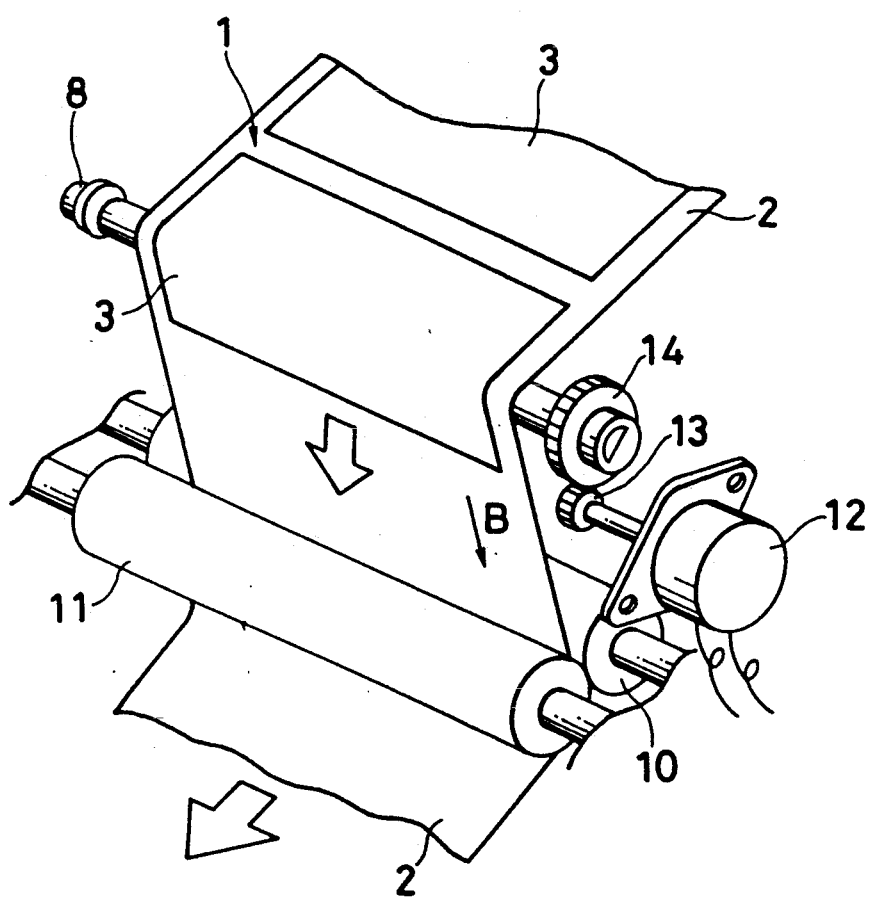
FIG. 3 is an enlarged illustration showing a bar code label peeling mechanism in a label remaining operation.

Referring to FIG. 1 to FIG. 3, there is shown a mechanism of a bar code label printer according to one embodiment of the present invention. In FIG. 1, a label sheet 1 includes a paper web 2 carrying plural labels 3 arranged at narrow regular intervals. The label sheet 1 is fed in an arrow A direction shown in FIG. 1 by a feeding mechanism including a platen 4.

On the platen 4 the label 3 is printed with a bar code by a thermal head 6 of a printing unit 5. Then, the label 3 is fed to a peeling unit 7 which is enlarged shown in FIG. 2. The peeling unit 7 includes a semicircular shaft 8 which is ordinarily set in a first position where the edge of the semicircular shaft 8 is in contact with the backsurface of the label sheet 1. This edge functions as a peeling point P. In other words, the label sheet 1 is forcibly turned at a sharp angle (substantially right angle) by the edge of the semicircular shaft 8 and thus fed in an arrow B direction. The label sheet 1 is drawn by a label sheet drawing unit 9 composed of a pair of drawing rollers 10 and a pinch roller 11 and finally discharged from the printer or wound by a winding wheel, not shown.

At the peeling point P, the label 3 is easily peeled from the paper web 2 because the label 3 is harder than the paper web 2 and the surface of the web 2 is provided with a resin coating to facilitate for separation of the label 3 from the web 2. Thus the peeled label 3 is directly fed in an arrow C direction and discharged through an outlet not shown, to issue as an effective bar code label.

The peeling unit 7 further includes, in addition to the semicircular 8, a drive motor 12 which is directly controlled by a main control unit 30, referred later, and two gears 13 and 14 mechanically connected to the drive motor 12.

The drawing roller 10 of the label sheet drawing unit 9 is mechanically connected to a feeding motor for driving the platen 4 through a gear unit not shown.

The printer is further equipped with an ink ribbon holder 16 carrying a roll of ink ribbon 18. The ink ribbon 8 travels in the same direction of the label sheet 1 and passed through between the platen 4 and the thermal head 6 so as to wholly overlap the ink ribbon 18 on the label sheet 1. Finally, the ink ribbon 18 is wound up by an winder 17 driven by a winding mechanism not shown.

The thermal head 6 of the printing unit 5 prints the bar code, responding to a data signal from the main control unit 30 onto the label 3 by thermal transfer function of the ink ribbon 18 and the thermal head 6.

In this embodiment, at any desirable position of the travelling line of the label sheet 1 prior to the printing unit 5 a paper sensor 19 is arranged, and after the printing unit 5 a bar code verifying unit 20 is arranged, respectively. For the paper sensor 19 a light transparent type photo sensor is preferably used. The bar code veryifying unit 20 includes a scanner 21 which scans a beam in the perpendicular direction with respect to the feeding direction of the label sheet 1 to read the bar code printed on the label 3. The read data is verified whether the bar code printed on this label 3 is effective or ineffective.

When the bar code printed on the label 3 is judged as NG; the bar code is formed with voids or spots, or the bars are too wide or narrow which cause mis-reading or disablement of reading, the same bar code as this is re-printed on the next label 3 by the thermal head 6 and the peeling unit 7 prevents the ineffective bar code label 3 from peeling from the paper web 2. As the ineffective bar code label approaches to the peeling unit 7, the semicircular shaft 8 is rotatingly changed in a second position as shown in FIG. 3 to turn the peeling position P (the edge of the semicircular shaft 8) backward and bring the circular surface of the shaft 8 into contact with the back surface of the label sheet 1. Thus the sheet 1 is softly turned around the circular surface of the shaft 8 and drawn by the label sheet drawing unit 9. The ineffective bar code label 3 remains on the web 2 and fed to the drawing unit 9.

The semicircular shaft 8 is returned to the first position shown in FIG. 2 when the effective bar code label (re-printed bar cord label) 3' approaches the peeling unit 7, so that the peeling operation on the next bar code label 3' can be performed again Of course the re-printed bar code label 3' is also verified whether it is effective or ineffective by the verifying unit 20. When the re-printed bar code label 3' is ineffective, the above described re-printing operation and the turning operation of the peeling point P are repeated.

When the verifying unit 20 continuously outputs the NG signal representing the ineffective bar code label rather than predetermined times, any alarming means such as buzzer, flasher light and the like may announce this irregular state to the operator.

The semicircular shaft 8 of the peeling unit 7 is not only to such the semicircular shape section. For example it may include an edge section and a convex section which can change turning angle of the label sheet 1 between a sharp turning angle and a soft turning angle.

Figure 4:
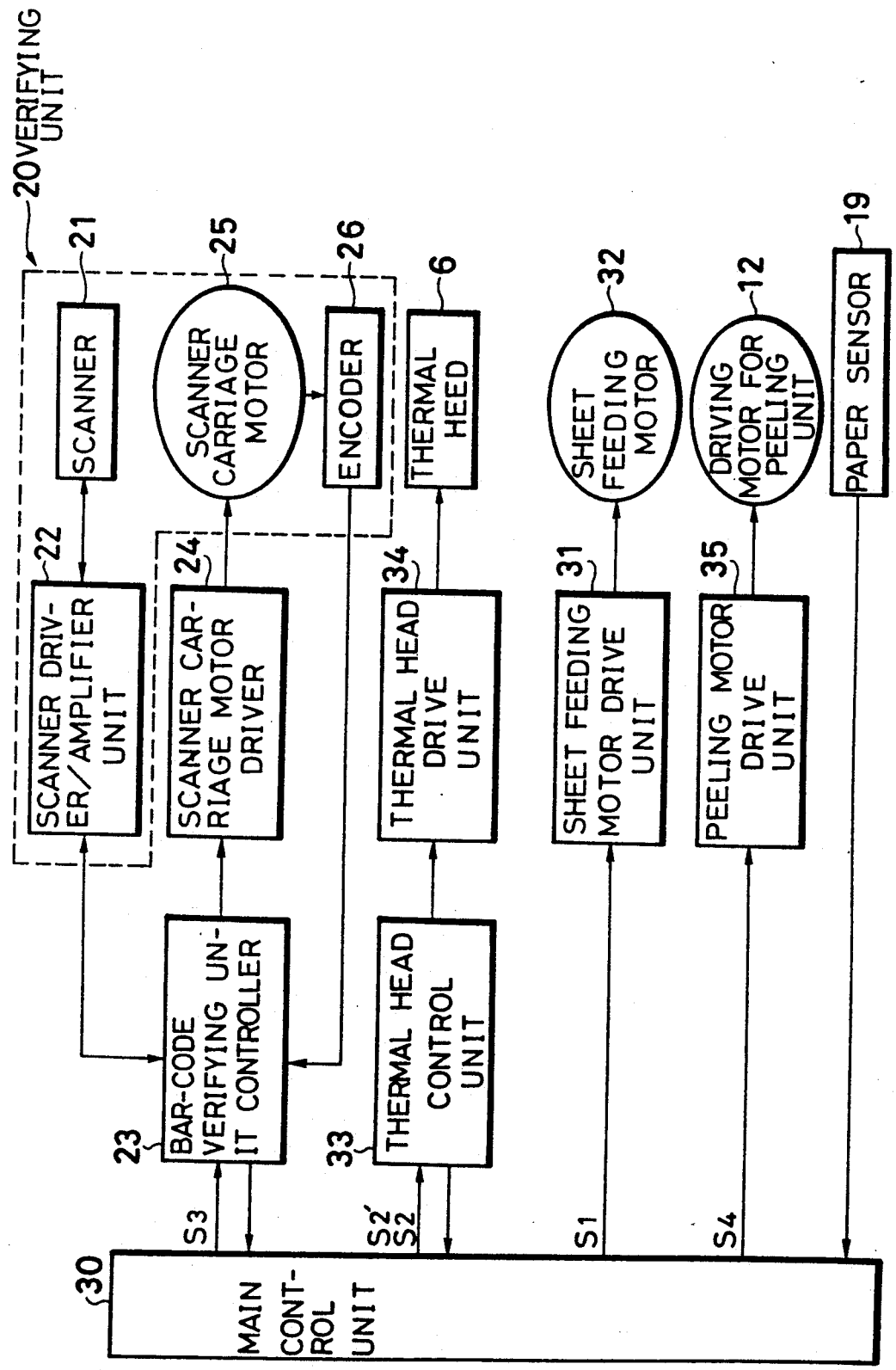
FIG. 4 is a block diagram showing a control system for this bar code label printer according to the present invention.

Referring to FIG. 4, there is shown a control system associated with the bar code label printer according to the present invention. The main control unit 30 described above is composed of a microcomputer including CPU, ROM, RAM and so on, to generally control the bar code label printer.

The main control unit 30 outputs a first control signal SI to a label sheet feeding motor drive unit 31 which energizes a label sheet feeding motor 32 in response to this signal SI. For the feeding motor 32 a step motor is preferably used. As the feeding motor 32 rotates, the platen 4 and the drawing roller 10 of the drawing unit 9 are rotated in the same direction to feed the label sheet 1 in the arrow A direction.

The paper sensor 19 detects the front end of the label 3 and outputs a signal to the main control unit 30. Since the main control unit 30 is previously stored with data representing the printing position, the scanning position and the peeling position, the main control unit 30 can currently calculate the actual position of the label 3. The distances between these positions and the paper sensor 19 are represented by step number of the feeding motor 32. Thus the main control unit 30 outputs a second control signal S2 to a thermal head control unit 33 when the label 3 reaches to the printing position. The thermal head control unit 33 actuates a thermal head drive unit 34 which allows the thermal head 6 to print a bar code in response to the input data on the label 3.

After this printing operation, the main control unit 30 outputs a third control signal S3 to a bar code verifying unit controller 23 to start the verifying operation of the verifying unit 20. The verifying unit 20 includes the scanner 21, a scanner driver/amplifier unit 22, a scanner carriage motor 25, and an encoder 26. The scanner 21 is driven by the scanner driver/amplifier unit 22 to read the bar code printed on the label 3 and also supplies the read information to the controller 23 through the amplifier unit 22. On the same occasion, the controller 23 outputs a start signal to the scanner carriage motor driver 24 which energizes the scanner carriage motor 25. The scanner 21 is scanned in the perpendicular direction to the sheet feeding direction and within the width of the label 3. This scanning motion is detected by the encoder 26 which feeds back the detected data to the controller 23.

The controller 23 is supplied with the read data from the scanner 21 to compare the read data with the input data to be printed and detects voids or spots in the printed bar code. In addition to comparing the bar code patterns, the controller 23 counts the number of bar elements and measures each dimension of the bar elements to judge whether the printed bar code is effective or ineffective. The controller 23 outputs the resulted information representing that the printed bar code is effective or ineffective to the main control unit 30.

When the printed bar code is ineffective, the main control unit 30 outputs a fourth control signal S4 to a peeling motor drive unit 35 which energizes the drive motor 12 for the peeling unit. The drive motor 12 makes the semicircular shaft 8 rotate in the second position where the edge of the shaft 8 is backwardly turned and the circular surface of the shaft 8 is brought into contact with the backsurface of the label sheet 1. The bar code label 3 is also softly turned by the circular surface of the shaft 8 so that it can be remained on the paper web 2.

Thus the ineffective bar code label 3 is drawn into the label sheet drawing unit 9.

On the same occasion, the main control unit 30 outputs a re-printing signal S2' to the thermal head control unit 33 so as to re-print the same bar code on the next label 3' in the same manner as before. The re-printed bar code label 3' is also checked by the bar code verifying unit 20 in the same manner as before. When the re-printed bar code label 3' is effective, the drive motor 12 for the peeling unit 7 makes the semicircular shaft 8 return to the first position so as to peel the re-printed bar code label 3'.

As disclosed above, the bar code label printer according to the embodiment of the present invention prints bar code on the label adhered to the sheet and then verifies the printed bar code whether the bar code label is effective or ineffective. When ineffective, the same bar code is reprinted on the next label and the ineffective bar code label is remained on the sheet without peeling. When effective, the bar code label is peeled and separated from the sheet. According to this manner, only the effective bar code labels are automatically issued to apply to commercial articles.

Figure 5:
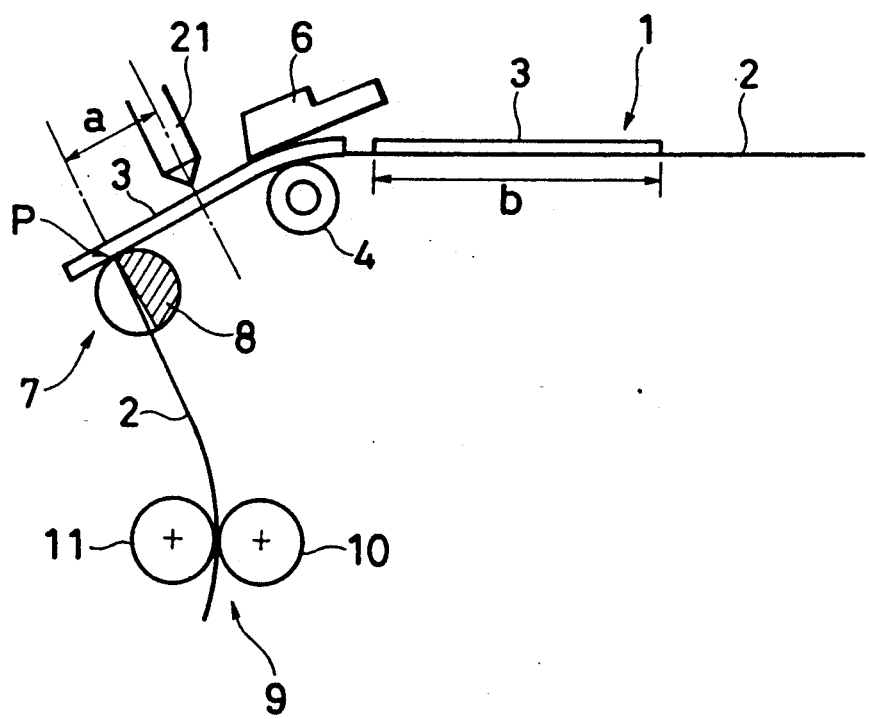
FIG. 5 is a schematic illustration showing an inordinary state of the peeling operation in the bar code label printer according to the present invention.

When the length "b" of the label 3 in the feeding direction is longer than the distance between the scanning position by the scanner 21 and the peeling position P of the peeling unit 7 as shown in FIG. 5, this bar code label printer must take following manner.

Since the forward end of the label 3 reaches to the peeling point P while the scanner 21 is scanning the bar code printed on the label 3, the label sheet feeding motion is rearwardly driven to return to the forward end of the label 3 before the peeling point P when the bar code label 3 is ineffective. This back motion allows the label 3 to adhere to the paper web 2 again. Then, the semicircular shaft 8 is turned by the drive motor 12 so that the peeling unit 7 is switched for the ineffective bar code label. The sheet feeding motion is also switched to the regular direction which allows the ineffective bar code label 3 to remain on the paper web 2.

Alternatively, the peeling point P may be movable to any required place which is sufficiently far from the scanner 21 of the verifying unit 20 in response to the length "b" of the label 3. In this case, the operation will be conducted in the same manner as described above.

As described above, the bar code label printer and the bar code label issuing method according to the present invention can verify the bar code printed on the label to find out ineffective bar codes prior to the peeling operation of the bar code label. The ineffective bar code label is not issued and remained on the paper web. Since the ineffective bar code is reprinted on the next label, the required bar code labels can be completely issued. These operations are automatically controlled so that operators can be free from troublesome work such as visual inspection of the issued bar code labels, manual re-printing of the ineffective bar code after all operations.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A bar code label printer including a label sheet feeding mechanism for feeding a label sheet on which plural labels are adhered to at regular intervals, a printing mechanism for printing bar code on the respective labels, a label peeling mechanism for peeling the printed labels from the label sheet, and a sheet drawing mechanism for drawing the label sheet after the peeling mechanism, further comprising;
    a bar code verifying means for verifying the bar code printed on the label to detect an ineffective bar code;
    a re-printing means for re-printing the same bar code as the ineffective bar code on the next label when the said bar code verifying means detects the ineffective bar code; and
    an ineffective bar code label remaining means for remaining the ineffective bar code label on the label sheet without peeling.

2. The bar code label printer as set forth in claim 1, wherein the said ineffective bar code label remaining means comprises a switching means for switching the said peeling mechanism between a label peeling position and a label remaining position in response to the verified result from the said bar code verifying means.

3. The bar code label printer as set forth in claim 2, wherein the said switching means includes a turning shaft which is formed with an edge section adapted for peeling the effective bar code label and a convex section adapted for remaining the ineffective bar code label on the sheet.

4. The bar code label printer as set forth in claim 3, wherein the said turning shaft is formed in a semicircular sectional shape whose circular surface is used for softly turning the label sheet to remain the bar code label on the label sheet and whose edge is used for sharply turning the label sheet to peel the bar code label from the sheet.

5. A bar code label issuing method using a bar code label printer including a label sheet feeding mechanism for feeding a label sheet on which plural labels are adhered to at regular intervals, a printing mechanism for printing bar code on the respective labels, a label peeling mechanism for peeling the printed labels from the label sheet, and a sheet drawing mechanism for drawing the label sheet after the peeling mechanism, comprising;
    a bar code label verifying step for verifying the bar code printed on the label to detect an ineffective bar code;
    a re-printing step for re-printing the same bar code as the ineffective bar code on the next label when the said bar code verifying means detects the ineffective bar code; and
    an ineffective bar code label remaining step for remaining the ineffective bar code label on the label sheet without peeling.

6. The bar code label issuing method as set forth in claim 5 further comprising a rearwardly feeding step for rearwardly feeding the label sheet before the peeling position by the said peeling mechanism when the front end of the bar code label is separating from the sheet and when the said bar code label verifying step judges the bar code label at the peeling step is ineffective, whereby this ineffective bar code label is adhered to the sheet again and fed to the peeling position.

* * * * *